US008984477B2

(12) United States Patent
Lee et al.

(10) Patent No.: US 8,984,477 B2
(45) Date of Patent: Mar. 17, 2015

(54) APPARATUS AND METHOD FOR PROVIDING INTEGRATED DEVELOPMENT ENVIRONMENT FOR NETWORK APPLICATION USING VARIOUS NETWORK PROCESSORS, AND SERVER USING THE SAME

(75) Inventors: Wang Bong Lee, Daejeon (KR); Dong Won Kang, Daejeon (KR); Sang Wan Kim, Daejeon (KR); Sang Kil Park, Daejeon (KR); Sang Sik Yoon, Daejeon (KR); Joon Kyung Lee, Daejeon (KR); Jong Dae Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 48 days.

(21) Appl. No.: 13/614,763

(22) Filed: Sep. 13, 2012

(65) Prior Publication Data
US 2013/0212560 A1 Aug. 15, 2013

(30) Foreign Application Priority Data

Feb. 10, 2012 (KR) .......................... 10-2012-0013962

(51) Int. Cl.
*G06F 9/44* (2006.01)
*G06F 9/45* (2006.01)
(52) U.S. Cl.
CPC . *G06F 8/36* (2013.01); *G06F 8/447* (2013.01)
USPC ......................................................... 717/109
(58) Field of Classification Search
CPC ....... H04L 67/02; H04L 69/329; H04L 67/22; H04L 67/2823; H04L 43/04; H04L 69/08; H04L 63/0823; H04L 67/10; H04L 67/28; H04L 63/083; H04L 63/10
USPC .................................. 717/109, 137, 146, 147
See application file for complete search history.

(56) References Cited

U.S. PATENT DOCUMENTS

2004/0006761 A1* 1/2004 Anand et al. ................... 717/101
2007/0121585 A1* 5/2007 Morrissey et al. ............. 370/352
(Continued)

FOREIGN PATENT DOCUMENTS

KR       10-0906756       7/2009
KR       1020110051991    5/2011

OTHER PUBLICATIONS

Dana Petcu, Ciprian Cracium, & Massimiliano Rak, Towards a Cross Platform Cloud API, 2011, Components for Cloud Federation, Closer, p. 166-169.*

*Primary Examiner* — Don Wong
*Assistant Examiner* — Reshaun M Finkley
(74) *Attorney, Agent, or Firm* — Nelson Mullins Riley & Scarborough LLP; Anthony A. Laurentano, Esq.; Dipti Ramnarain, Esq.

(57) ABSTRACT

The present invention provides an apparatus and a method for an integrated developing environment for a network application, including: an application storing part to store an application produced by a user; an application attribute managing part to manage attribute information for the application; a target code creating part to compile the application stored in the application storing part based on the attribute information stored in the application attribute managing part and create a target code corresponding to the compiled application; and a code loading part to mount the target code created by the target code creating part in hardware.

16 Claims, 6 Drawing Sheets

(56) References Cited

U.S. PATENT DOCUMENTS

| | | |
|---|---|---|
| 2009/0313004 A1* | 12/2009 | Levi et al. .................. 703/28 |
| 2010/0146492 A1* | 6/2010 | Shacham et al. ............ 717/137 |
| 2011/0069719 A1* | 3/2011 | Fries et al. ................. 370/463 |
| 2012/0303954 A1* | 11/2012 | Ding ........................... 713/165 |
| 2013/0152067 A1* | 6/2013 | Fernandez-Ruiz et al. ... 717/172 |
| 2014/0007132 A1* | 1/2014 | Gaxiola et al. .............. 718/105 |
| 2014/0233584 A1* | 8/2014 | Lin et al. .................... 370/420 |

* cited by examiner

APPARATUS AND METHOD FOR PROVIDING INTEGRATED DEVELOPMENT ENVIRONMENT FOR NETWORK APPLICATION USING VARIOUS NETWORK PROCESSORS, AND SERVER USING THE SAME

CROSS-REFERENCE TO RELATED APPLICATIONS

This application claims priority to and the benefit of Korean Patent Application No. 10-2012-0013962 filed in the Korean Intellectual Property Office on Feb. 10, 2012, the entire contents of which are incorporated herein by reference.

TECHNICAL FIELD

The present invention relates an apparatus and a method for providing integrated development environment for a network application using various network processors, and a server using the same, and more particularly, to an apparatus and a method for integrally developing a network application which provide various network applications with a commonly usable network application program interface (API) to allow various applications to be produced and allow the produced applications to be performed in various network processors to increase reusability, and a server using the same.

BACKGROUND ART

A network application refers to an application program implemented in a portable digital processing apparatus such as a mobile phone, a portable multimedia player (PMP) and the like. A method of producing a network application in the related art is determined according to a type of a platform where the network application is implemented. Here, a platform refers to a system serving as a basis for executing an application which is an application program, and a representative platform capable of executing a network application includes Binary Runtime Environment for Wireless™ (BREW), Java 2 Platform Micro Edition™ (J2ME), Mobile Information Device Profile (MIDP), Wireless Internet Platform for Interoperability (WIPI), General Virtual Machine (GVM), and the like.

Such various platforms provide different development environments according to the characteristics of the hardware. For example, if a network processor (NP) used in a platform is an Intel™ chip, an application may be produced only using a corresponding development environment. It is also difficult to reuse a development code produced in the corresponding development environment in a different network processor.

In recent years, online development environments are being provided by Salesforce.com™, Google™, Microsoft, and the like, but Salesforce.com, Google, Microsoft™, and the like provide only very limited development environments and support reuse of already developed codes.

In detail, Salesforce.com™ provides a test server together with a development server while supporting web-based Force.com IDE and Eclipse based Force.com IDE in an online development environment for supporting development of an application service managed on a Development as a Service (Daas) platform called Force.com™. However, since Daas provides a very limited development environment, a user can neither select and configure a development environment on demand nor download or reuse a developed code.

Google™ allows construction of a web application using Google Application Engine (GAE), but there is a limit in that GAE supports only Python™ 2.5.2 and Java™ language (JRE 6) execution environments.

In Windows Azure Services Platform provides a development environment by using a software development kit (SDK) approaching Windows Azure called Azure Runtime to support development of cloud computing software and generally applicable software. However, a user can neither select nor configure a development environment on demand, nor reuse a developed application code.

SUMMARY OF THE INVENTION

The present invention has been made in an effort to provide an apparatus and a method for providing integrated development environment for a network application using various network processors which provides a network application program interface (API) commonly useable in various network applications to allow various applications to be produced and allow the produced applications to be performed in various network processors to increase reusability, and a server using the same.

An exemplary embodiment of the present invention provides an apparatus for providing integrated development environment for a network application using various network processors, including: an application storing part configured to store an application produced by a user; an application attribute managing part configured to manage attribute information for the application, including input information, output information, and information regarding a connection between an input and an output; a target code creating part configured to compile the application stored in the application storing part based on the attribute information stored in the application attribute managing part and create a target code corresponding to the compiled application; and a code loading part configured to mount the target code created by the target code creating part in hardware.

The apparatus may further include: an input module configured to control at least one of a text based input and a graphic user interface (GUI) based input for the application storing part, the application attribute managing part, the target code creating part, and the code loading part.

The apparatus may further include: a log information managing part configured to record log information for the target code mounted by the code loading part.

The application storing part may include: a list creating unit configured to register a set of applications produced by a user, and create a list of the set of applications; and a list attribute managing unit configured to manage attribute information for the applications registered in the list creating unit.

The application storing part may further include: an input module connected to the list creating unit and the list attribute managing unit and configured to control at least one of a text based input and a graphic user interface based input.

The application attribute managing part may include: an attribute table configured to manage attribute information including input information, output information, and memory information corresponding to an application with a table; and an application configuring unit configured to store configuration information including port information of hardware which is to be used by an application managed by the attribute table and connection information corresponding to the port information.

The application attribute managing part may further include: an input module connected to the attribute table and the application configuring unit and configured to control at least one of a text based input and a graphic based input.

The target code creating part may further include: a packet frame creating unit configured to create a packet frame by using a packet processing description language for the application stored in the application storing part; and a target code converting unit configured to convert the packet frame created by the packet frame creating unit into a target code corresponding to the hardware.

The target code creating part may further include a target code storing unit configured to store a target code provided by the hardware.

The target code creating part may further include: an input module connected to the packet frame creating unit, the target code converting unit, and the target code storing unit and configured to control at least one of a text based input and a graphic user interface based input.

The code loading part may include: a load managing unit configured to manage uploading, unloading, and correction of a target code for the hardware; and a connector configured to transmit and receive data to and from the hardware.

The code loading part may further include: an input module connected to the load managing unit and the connector and configured to control at least one of a text user interface based input and a graphic based input.

Another exemplary embodiment of the present invention provides a method for providing integrated development environment for a network application using various network processors, including: managing attribute information for an application, including input information, output information, and information regarding a connection between an input and an output with an application profile, and storing an application produced by a user in an application storing part; compiling the application stored in the application storing unit based on the attribute information managed with the application profile and creating a target code corresponding to the compiled application; and mounting the target code created in the creating of the target code in hardware.

The method may control a text based input and/or a graphic user interface (GUI) based input for at least one of an application managed by the application profile, an application stored in the application storing part, an application compiled in the creating of the target code, and a target code mounted in the mounting of the target code.

The method may further include: recording log information on the target code mounted in the mounting of the target code.

According to the exemplary embodiment of the present invention, applications for hardware for various network processors can be produced by providing network applications with a commonly usable application program interface (API).

According to the exemplary embodiment of the present invention, the produced applications can be performed in various network processors, which can increase reusability.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus and a method for providing integrated development environment for a network application using various network processors, and a server using the same according to exemplary embodiment of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 1:
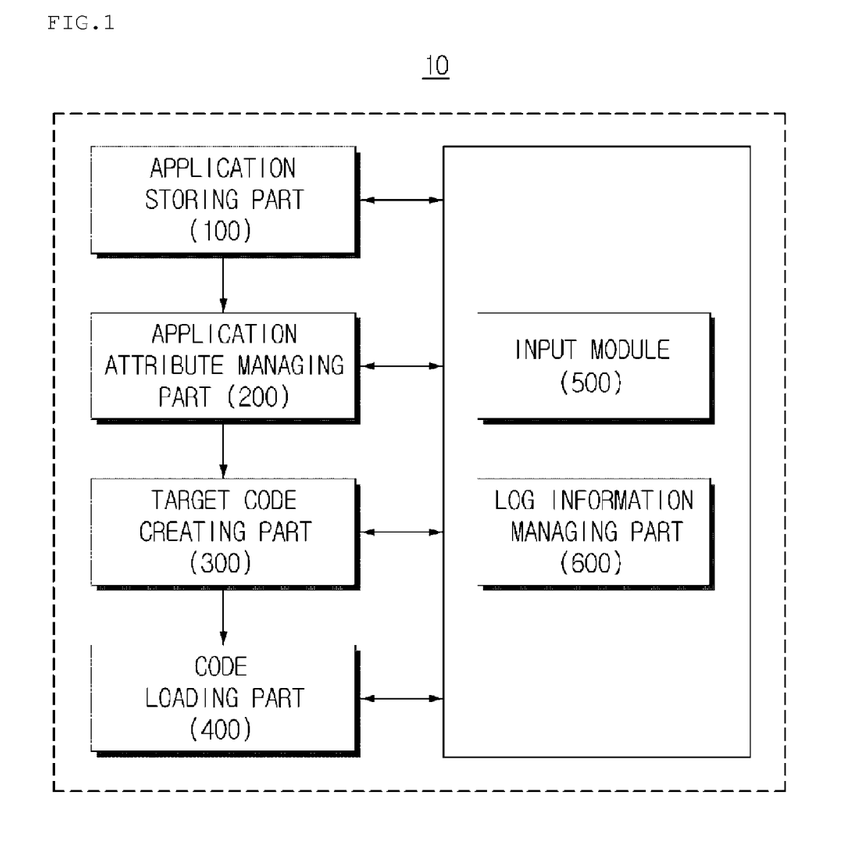
FIG. 1 is a block diagram schematically illustrating an apparatus for providing integrated development environment for a network application using various network processors according to an exemplary embodiment of the present invention.

FIG. 1 is a block diagram schematically illustrating an apparatus for providing integrated development environment for a network application using various network processors according to an exemplary embodiment of the present invention.

Referring to FIG. 1, an apparatus 10 for providing integrated development environment for a network application using various network processors according to the exemplary embodiment of the present invention may include an application storing part 100, an application attribute managing part 200, a target code creating part 300, a code loading part 400, an input module 500, and a log information managing part 600.

Figure 2:
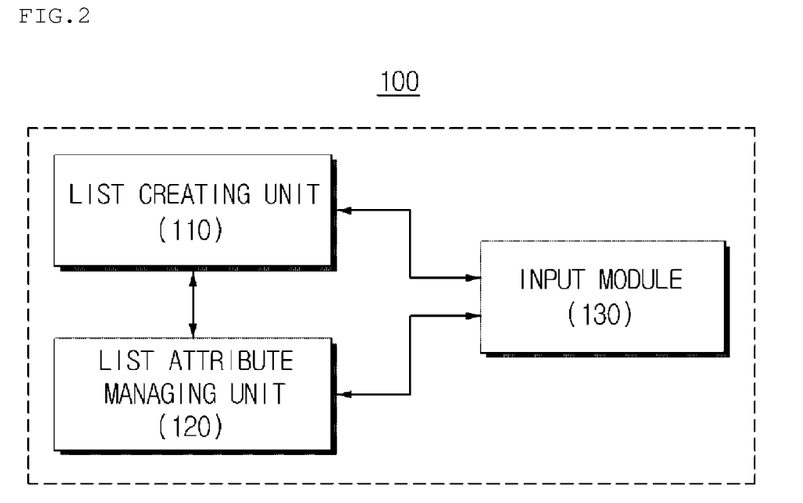
FIG. 2 is a block diagram schematically illustrating a configuration of an application storing part of FIG. 1.

The application storing part 100 stores an application produced by a user. In this case, the application storing part 100 may classify a source format, an object format, and a load format of the application produced by a user to store the classified source format, object format, and load format. To this end, as illustrated in FIG. 2, the application storing part 100 may include a list creating unit 110, a list attribute managing unit 120, and an input module 130.

The list creating unit (library tabler) 110 registers a set of applications produced by user, and creates a list of the set of applications. In this case, the list creating unit 110 may extract transmission control protocol (TCP) specific port information to register the extracted information together with the applications regarding the information.

The list attribute managing unit (library attributer) 120 manages attribute information regarding the applications registered in the list creating unit 110. In this case, the list attribute managing unit 120 may store attribute information regarding the applications such as input information, port information, and information regarding a connection between an input and an output, in addition to attribute information such as source formats, object formats, and load formats for the applications registered in the list creating unit 110.

The input module 130 is connected to the list creating unit 110 and the list attribute managing unit 120, and controls a text based and/or graphic user interface based input. Here, the input module 130 may be omitted, and in this case, a function of the input module 130 may be performed by the input module 500.

The application attribute managing part 200 manages attribute information for the application, including input information, output information, and information regarding a connection between an input and an output. In this case, the application attribute managing part 200 may manage attribute information, including input information, output information, and information regarding a connection between an input and an output, regarding all applications which may be developed by the apparatus 10 for integrally developing a network application according to the exemplary embodiment of the present invention. The attribute information of the applications may be added, deleted, or corrected through the input module 500.

Figure 3:
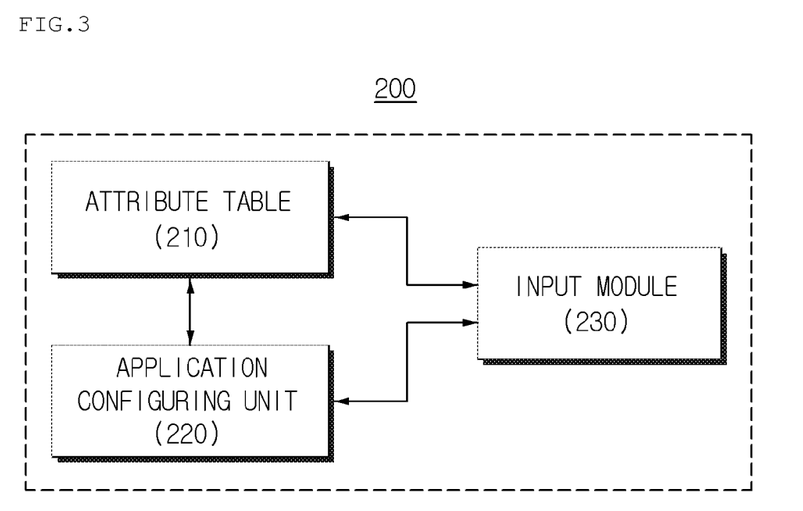
FIG. 3 is a block diagram schematically illustrating a configuration of an application attribute managing part of FIG. 1.

FIG. 3 is a block diagram schematically illustrating a configuration of an application attribute managing part of FIG. 1.

Referring to FIG. 3, the application attribute managing part 200 may include an attribute table 210, an application configuring unit 220, and an input module 230.

The attribute table 210 manages attribute information including input information, output information, and memory information corresponding to an application which may be developed by the apparatus 10 for integrally developing a network application according to the exemplary embodiment of the present invention.

The application configuring unit 220 may store configuration information including port information of hardware to be used by the applications managed by the attribute table 210 and connection information corresponding to the port information.

The input module 230 is connected to the attribute table 210 and the application configuring unit 220, and controls a text based and/or graphic user interface based input. Here, the input module 230 may be omitted, and in this case, a function of the input module 230 may be performed by the input module 500.

Figure 4:
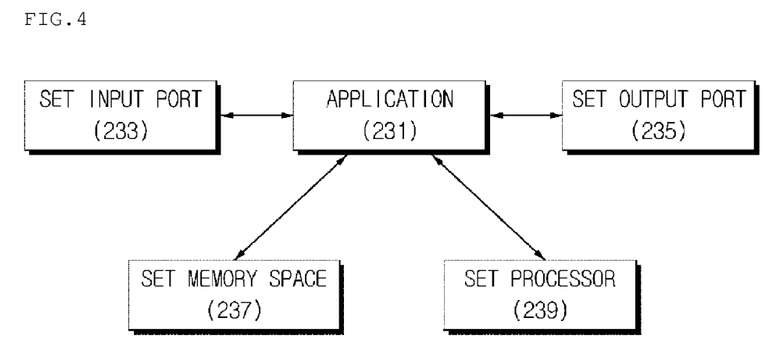
FIG. 4 is a schematic diagram illustrating an example of a process of mapping an application and hardware information by an application attribute managing part of FIG. 3.

The mapping of an application and hardware information may be implemented as illustrated in FIG. 4. That is, an application to be used may be selected through the input module 500 to be dragged on a screen (231), and a signal for setting of an input port for the corresponding application (233) and setting an output port for the corresponding application (235) may be input. A memory space to be used may be set through the input module 500 (237), and a processor of hardware to which the corresponding application is loaded may be set (239). The setting processes may be omitted, and in this case, a basically set default value may be set automatically.

The target code creating part 300 compiles the application stored in the application storing part 100 based on the attribute information stored in the application attribute managing part 200, and creates a target code corresponding to the compiled application.

Figure 5:
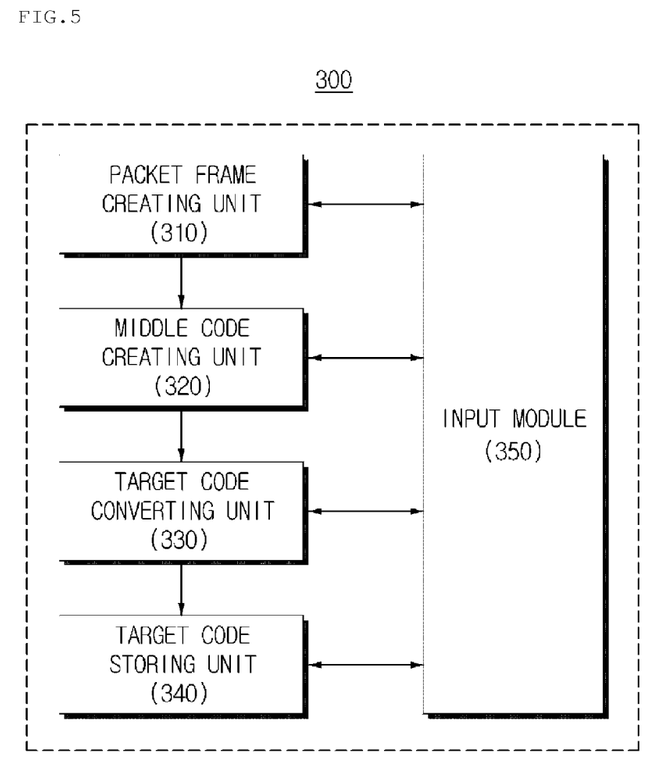
FIG. 5 is a block diagram schematically illustrating a configuration of a target code creating part of FIG. 1.

FIG. 5 is a block diagram schematically illustrating a configuration of a target code creating part of FIG. 1.

Referring to FIG. 5, the target code creating part 300 may include a packet frame creating unit 310, a middle code creating unit 320, a target code converting unit 330, a target code storing unit 340, and an input module 350.

The packet frame creating unit 310 creates a packet frame for an application stored in the application storing part 100 by using a packet processing description language. Here, the packet processing description language is a language used to process a network packet, and a packet refers to a transmission unit of various currently standardized communication data. The packet processing description language may create various packet frames based on a packet description database by using Extensible Markup Language (XML). Packets may be processed by using action instructions for the corresponding packets. The action instructions may include DROP, FORWARD, PASS, and the like. The packet processing description language may be replaced by general languages such as C-language and Java™ language. The binaries of the packet frame created by the packet frame creating unit 310 are stored in the application storing part 100, or serves as a basis by which the packet frame is uploaded in hardware through the code loading part 400.

The middle code creating unit 320 may convert the packet frame created by the packet frame creating unit 310 into a middle code to arrange the packet frame. The middle code creating unit 320 may be omitted.

The target code converting unit 330 converts a packet frame created by the packet frame creating unit 310 or a middle code created by the middle code creating unit 320 into a target code according to hardware to which the corresponding application is uploaded. In this case, the target code storing unit 340 may store the target code provided by the hardware to which the corresponding application is uploaded, and the target code converting unit 330 may convert the packet frame created by the packet frame creating unit 310 or the middle code created by the middle code creating unit 320 into the target code according to the hardware to which the corresponding application is uploaded, based on the target code stored in the target code storing unit 340. Through this, if the hardware is a million instructions per second (MIPS) based processor, the packet frame or the middle code may be converted to a target code.

The input module 350 may be connected to the packet frame creating unit 310, the middle code creating unit 320, the target code converting unit 330, and the target code storing unit 340, and may control at least one of a text based input and a graphic user input based input. Here, the input module 350 may be omitted, and in this case, a function of the input module 350 may be performed by the input module 500.

Figure 6:
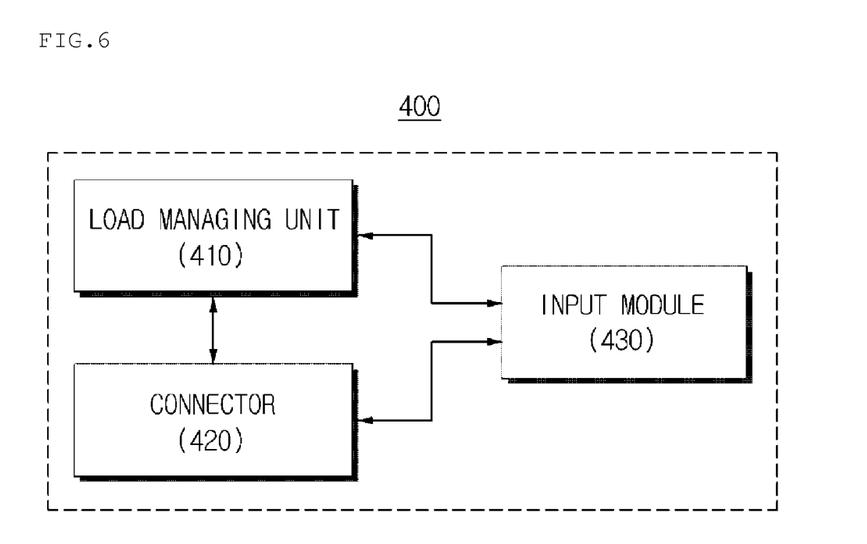
FIG. 6 is a block diagram schematically illustrating a configuration of a code loading part of FIG. 1.

The code loading part 400 mounts the target code created by the target code creating part 300 to hardware, or performs a management such as unloading or correction. To this end, as illustrated in FIG. 6, the code loading part 400 may include a load managing unit 410, a connector 420, and an input module 430.

The load managing unit 410 performs management such as uploading, unloading, and correction of the target code for the hardware to which the application is mounted.

The connector 420 transmits and receives data to and from the hardware to which the application is mounted, so that the load managing unit 410 can upload, unload, or correct the target code in the corresponding hardware. The communication channel may be connected in an one-to-one or one-to-many way, and may secure reliability by using a hands shaking function.

The input module 430 is connected to the load managing unit 410 and the connector 420, and controls a text based and/or graphic based input. Here, the input module 430 may be omitted, and in this case, a function of the input module 430 may be performed by the input module 500.

The input module 500 may be connected to the application storing part 100, the application attribute managing part 200, the target code creating part 300, and the code loading 400, and may control a text based and/or graphic based input.

The log information managing part 600 records log information regarding the target code mounted to the hardware by the code loading part 400. In this case, the log information managing part 600 may be a commonly used database, and may record log information in various ways.

Figure 7:
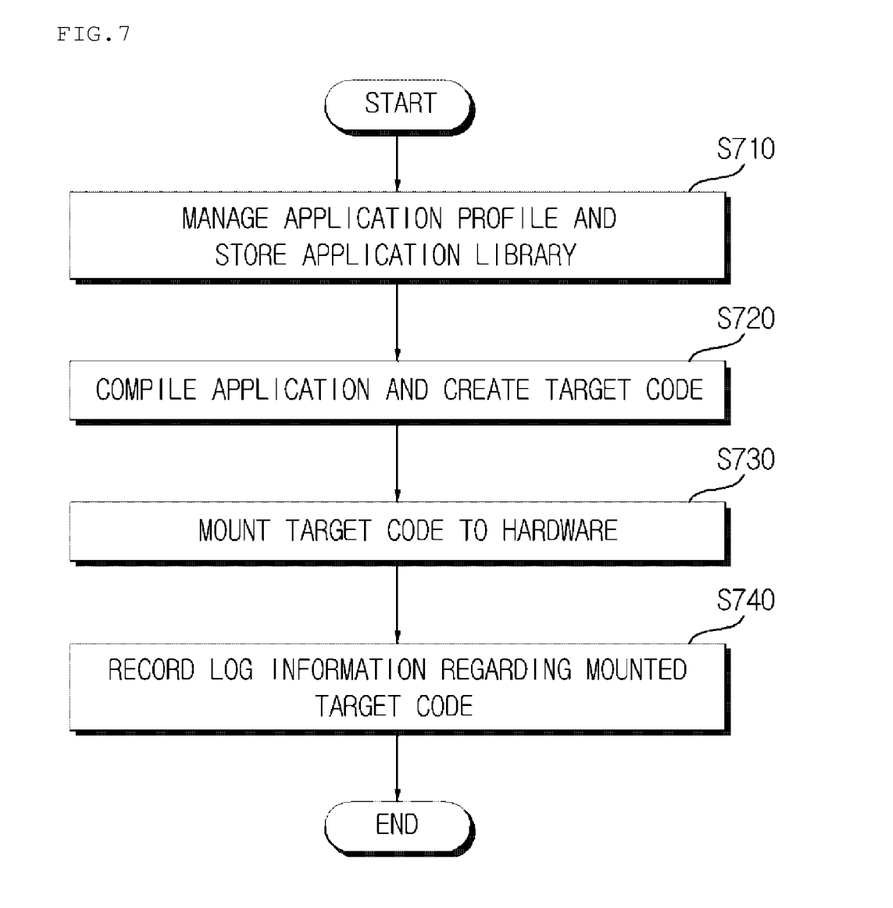
FIG. 7 is a flowchart illustrating a method for providing integrated development environment for a network application using various network processors according to an exemplary embodiment of the present invention.

FIG. 7 is a flowchart illustrating a method for providing integrated development environment for a network application using various network processors according to an exemplary embodiment of the present invention.

Referring to FIGS. 1 to 7, the application attribute managing part 200 manages attribute information for an application including input information, output information, and information regarding a connection between an input and an output with an application profile, and the application storing part 100 stores an application produced by a user (S710). To this end, the function of the application storing part 100 and the function of the application attribute managing part 200 which have been described with reference to FIGS. 2 to 4 may be performed.

The target code creating part 300 compiles the application stored in the application storing part 100 based on the attribute information managed by the application attribute managing part 200, and creates a target code corresponding to the compiled application. To this end, the function of the target code creating part 300 illustrated in FIG. 5 may be performed.

The code loading part 400 mounts the target code created by the target code creating unit 300 to the hardware (S730), and the log information managing part 600 records the log information regarding the target code mounted to the hardware by the code loading part 400 (S740).

In this process, the input module 500 may be connected to the application storing part 100, the application attribute managing part 200, the target code creating part 300, and the code loading 400, and may control a text based and/or graphic user interface based input.

Figure 8:
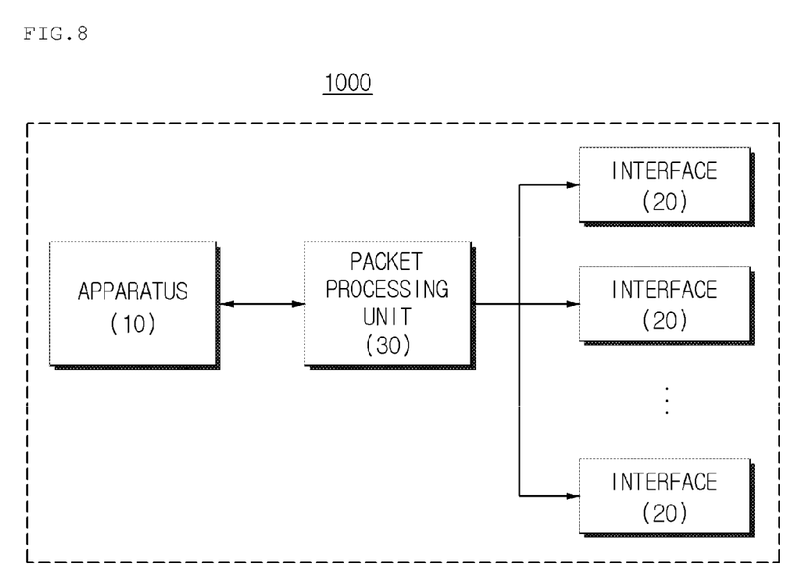
FIG. 8 is a block diagram schematically illustrating a system employing an apparatus for providing integrated development environment for a network application using various network processors according to the exemplary embodiment of the present invention.

FIG. 8 is a block diagram schematically illustrating a system employing an apparatus for providing integrated development environment for a network application using various network processors according to the exemplary embodiment of the present invention. This system 100 may include an Intel™-based CPU, and MIPS-based or Advanced Telecommunications Computing Architecture™ (ATCA) standard apparatus.

Referring to FIG. 8, the apparatus 10 may perform the functions of the application storing part 100, the application attribute managing part 200, the target code creating part 300, the code loading part 400, the input module 500, and the log information managing part 600, which have been described with reference to FIGS. 1 to 6.

An interface 20 connects the hardware to which the application is mounted and the apparatus 10. In this case, the interface 20 may be connected to the apparatus 10 not only in a one-to-one way but also in a one-to-many way. Here, the interface 20 may be the Ethernet, or 1G/10G/100G interface, and the hardware may include an Intel™ central process unit (CPU) based processor and a million instructions per second (MIPS) based processor.

A packet processing unit 30 converts and processes a packet for a target code transmitted by the apparatus 10 which has been described with reference to FIGS. 1 to 6 according to the hardware connected to correspond to at least one interface 20. That is, the packet processing unit 30 converts and processes a packet for a target code transmitted by the apparatus 10 according to the hardware connected to correspond to the interface 20 and transmits the packet to the hardware. In this case, the packet processing unit 30 may include functions such as packet parsing, packet processing for functions, and resource control. The functions of packet parsing and processing may be defined according to a protocol defined by a user. For example, the functions may include a function of creating a flow by using a specific field of an IPV4 packet and a function of performing packet dropping in the case of including a specific field of an IPV6 packet, and may be defined according to a specific purpose of a user.

A communication channel between the apparatus 10 and the packet processing unit 30 may be a PCI bus or an Ethernet 10G or 100G switching channel. The communication channel may be a unique communication channel of a chassis constituting a system. When a server uses an ATCA standard, a communication channel with a standard corresponding to the ATCA standard, or a non-blocking crossbar switching channel may be used.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for an integrated developing environment for a network application using various network processors, comprising:

an application storing part configured to store an application produced by a user;

an application attribute managing part configured to manage attribute information for the application, including input information, output information, and information regarding a connection between an input and an output;

a target code creating part configured to compile the application, created on a first network application platform, stored in the application storing part based on the attribute information stored in the application attribute managing part and create a target code on a second and different target network application platform, wherein the target code corresponds to the compiled application created on the first network application platform, and wherein the target code creating part further includes:

a packet frame creating unit configured to create a packet frame by using a packet processing description language for the application stored in the application storing part; and a target code converting unit configured to convert the packet frame created by the packet frame creating unit into the target code corresponding to hardware on the second and different target network application platform; and a code loading part configured to mount the target code created by the target code creating part in the hardware in the second and different target network application platform.

2. The apparatus of claim 1, further comprising: an input module configured to control at least one of a text based input and a graphic user interface (GUI) based input for the application storing part, the application attribute managing part, the target code creating part, and the code loading part.

3. The apparatus of claim 1, further comprising: a log information managing part configured to record log information for the target code mounted by the code loading part.

4. The apparatus of claim 1, wherein the application storing part includes: a list creating unit configured to register a set of applications produced by a user, and create a list of the set of applications; and a list attribute managing unit configured to manage attribute information for the applications registered in the list creating unit.

5. The apparatus of claim 4, wherein the application storing part further includes: an input module connected to the list creating unit and the list attribute managing unit and configured to control at least one of a text based input and a graphic user interface based input.

6. The apparatus of claim 1, wherein the application attribute managing part further includes: an attribute table configured to manage attribute information including input information, output information, and memory information corresponding to an application with a table; and an application configuring unit configured to store configuration information including port information of hardware which is to be used by an application managed by the attribute table and connection information corresponding to the port information.

7. The apparatus of claim 6, wherein the application attribute managing part further includes: an input module connected to the attribute table and the application configuring unit and configured to control at least one of a text based input and a graphic user interface based input.

8. The apparatus of claim 1, wherein the target code creating part further includes a target code storing unit configured to store a target code provided by the hardware.

9. The apparatus of claim 8, wherein the target code creating part further includes an input module connected to the list packet frame creating unit, the target code converting unit, and the target code storing unit and configured to control at least one of a text based input and a graphic user interface based input.

10. The apparatus of claim 1, wherein the code loading part includes: a load managing unit configured to manage uploading, unloading, and correction of a target code for the hardware; and a connector configured to transmit and receive data to and from the hardware.

11. The apparatus of claim 10, wherein the code loading part further includes an input module connected to the load managing unit and the connector and configured to control at least one of a text based input and a graphic user interface based input.

12. A method for providing an integrated developing environment for a network application using various network processors, comprising:

managing attribute information for an application, including input information, output information, and information regarding a connection between an input and an output with an application profile, and storing an application produced by a user in an application storing part;

compiling the application, created on a first network application platform, stored in the application storing unit based on the attribute information managed with the application profile and creating a target code on a second and different target network application platform corresponding to the compiled application created on the first network application platform, wherein the target code corresponds to the compiled application created on the first network application platform, and wherein the target code creating part further includes:

creating a packet frame by using a packet processing description language for the application stored in the application storing part; and converting the packet frame created by the packet frame creating unit into the target code corresponding to hardware on the second and different target network application platform; and mounting the target code created in the creating of the target code in the hardware in the second and different target network application platform.

13. The method of claim 12, wherein a text based input and/or a GUI based input is controlled for at least one of an application managed by the application profile, an application stored in the application storing part, an application compiled in the creating of the target code, and a target code mounted in the mounting of the target code.

14. The method of claim 12, further comprising: recording log information on the target code mounted in the mounting of the target code.

15. A system for providing an integrated developing environment, comprising:

a packet processing apparatus for converting and processing transmitted and received data in units of packets, which is connected between an apparatus for providing an integrated development environment for a network application using one or more network processors and at least one interface connecting hardware and the apparatus, and converting and processing a packet for target code transmitted by the apparatus according to the hardware connected in correspond to the interface, wherein the apparatus for providing the integrated development environment is configured to:

manage attribute information for an application, including input information, output information, and information regarding a connection between an input and an output with an application profile, store an application produced by a user, and created on a first network application platform and in an application storing part, compile the application stored in the application storing unit based on the attribute information managed with the application profile, create a target code, on a second and different target network application platform, corresponding to the compiled application created on the first network application platform, wherein the target code corresponds to the compiled application created on the first network application platform, and wherein the target code creating part further includes:

create a packet frame by using a packet processing description language for the application stored in the application storing part; and convert the packet frame created by the packet frame creating unit into the target code corresponding to hardware on the second and different target network application platform, and transmit the created target code to the hardware in the second and different target network application platform.

16. The system of claim 15, wherein the packet processing apparatus comprises data transmitted and received between the hardware, including a central processor and a million instructions per second (MIPS) based processor and the apparatus is converted and processed.

\* \* \* \* \*